United States Patent Office 3,618,471
Patented Nov. 9, 1971

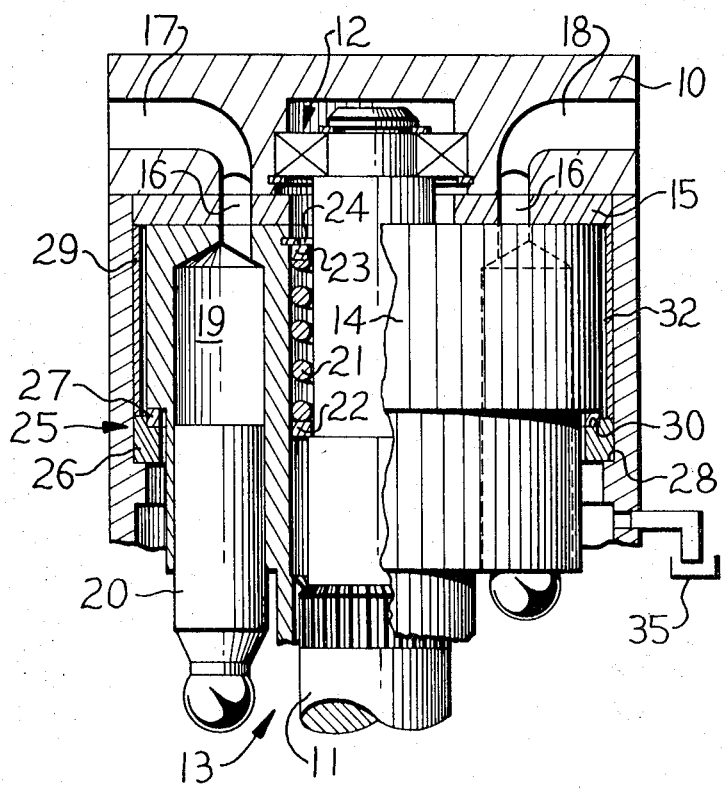
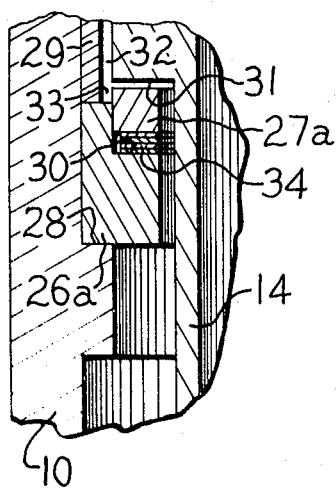
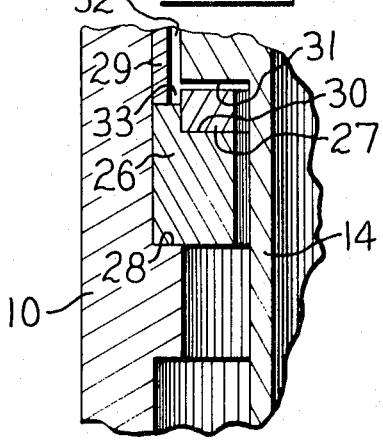

3,618,471
HYDRODYNAMIC THRUST BEARING FOR AXIAL PISTON-TYPE PUMP OR MOTOR
Allyn J. Hein and Gilbert Tribley, Joliet, Ill., assignors to Caterpillar Tractor Co., Peoria, Ill.
Filed Aug. 21, 1969, Ser. No. 851,896
Int. Cl. F04b 1/20
U.S. Cl. 91—485                                    8 Claims

ABSTRACT OF THE DISCLOSURE

An axial piston-type pump or motor has a hydrodynamic thrust bearing arrangement disposed between the housing and cylinder barrel thereof. Such bearing arrangement comprises a bearing holder and a bearing ring mounted in circumferential counterbores formed in the housing and bearing holder, respectively. A cylindrical spacer sleeve is disposed between the bearing holder and a port plate to aid in positively maintaining the integrated structures in their correct positions. A fluid passage is defined between the spacer sleeve and the cylinder barrel to communicate lubricating fluid to the thrust bearing.

---

Axial piston-type pumps or motors utilized for actuating implements employed in earthmoving vehicles, for example, are subjected to prolonged and heavy-duty usage. An acceptable pump or motor design must compensate for numerous operating parameters, including centrifugal and transient input forces and the like which tend to induce undue fluid leakage by separating a cylinder barrel from its mating port plate. Failure to provide means for positively and efficiently maintaining the cylinder barrel and port plate in intimate contact oftentimes results in scuffing and related damage to the integrated assembly. In the event of such damage, the pump will be either rendered inoperative or its efficiency substantially impaired.

An object of this invention is to overcome the above, briefly described problems by providing an economical and efficient thrust bearing means for an axial piston-type pump or motor adapted to continuously maintain intimate contact between the cylinder barrel and port plate thereof. The preferred thrust bearing means is of the hydrodynamic type and comprises a superimposed bearing holder and bearing ring located adjacent an end of the cylinder barrel and a surrounding housing. If so desired, a cylindrical spacer may be positioned between the bearing holder and the port plate to further increase the structural integrity of the integrated structures.

Other objects of this invention will become apparent from the following description and accompanying drawings wherein:

FIG. 1 is a partially sectioned, side-elevational view of an axial piston-type pump or motor employing the hydrodynamic thrust bearing arrangement of this invention therein;

FIG. 2 is an enlarged view of such thrust bearing; and

FIG. 3 is a modified form of the FIG. 2 thrust bearing.

The fluid displacement device illustrated in FIG. 1 may be suitably integrated into the implement circuit of an earthmoving machine, for example, to operate as a pump or motor in a conventional manner. Such device comprises a cylindrical, multi-part housing 10 having an input shaft 11 rotatably mounted therein by roller baering 12 and a second roller bearing (not shown). The spaced roller bearings position the pump shaft radially and axially. A "loose" spline connection 13 operatively attaches the shaft to a cylinder barrel 14 mounted in the housing to rotate about a longitudinal axis thereof.

An annular port plate 15, disposed perpendicular relative to such axis, is suitably secured to the housing and has standard ports 16 formed therein adjacent to a first end of the cylinder barrel. Such ports are adapted to communicate inlet and outlet passages 17 and 18, respectively, with cylindrical bores 19. Each bore has a conventional piston 20 reciprocally mounted therein. The free ends of the pistons are adapted to be selectively reciprocated by their engagement with a conventional inclined cam (not shown).

The first end of a compressed coil spring or spring means 21 is positioned to abut a first retainer ring 22 mounted on a stepped-down flange portion formed on the input shaft. A second retainer ring 23, held in position by an expansion-type snap ring 24 attached to the cylinder barrel, cooperates with the first retainer ring to positively retain the spring therebetween. The spring primarily functions to urge surface portions of the cylinder barrel into intimate contact with juxtaposed surface portions of the port plate to insure efficient fluid flow between ports 16 and bores 19.

During high speed operations, for example, the cylinred barrel, cooperates with the first retainer ring to posi- increased fluid flow demands. Also, downhill operation of a wheel-type earthmoving vehicle, for example, may tend to operate the pump at 50% or more above its rated speed. Centrifugal forces and the like increase in proportion to the square of increase in speed to induce a tipping of the cylinder barrel and thus a separation between the contacting surface portions of the cylinder barrel and port plate.

Conventional pumps or motors normally rely on a spring similar to spring 21 to counteract such operating phenomena. An increase in the force of the spring tends to alleviate barrel tipping, but also functions to unduly increase frictional drag occurring between the contacting surface portions of the cylinder barrel and port plate. Another prior art solution, which has not proved totally acceptable, is the addition of radially disposed roller bearings between the cylinder barrel and housing.

This invention is primarily drawn to the application of a thrust betaring means 25 adjacent to a second end of the cylinder barrel to overcome the above-described tipping and related problems. The integrated structures further aid in preventing damage to the pump should a damaged piston, for example, become jammed in the barrel. Although the thrust bearing means is hereinafter described as preferably comprising a continuous, circular configuration it should be understood that it could comprise two or more semi-circular segments suitably spaced one from another in radially disposed relationship around the barrel.

The thrust bearing preferably comprises an annular bearing holder 26 superimposed on a bearing ring 27, both positioned adjacent to the second end of the cylinder barrel. It should be understood that the thrust bearing could be otherwise positioned, such as at the extreme end of the cylinder barrel. Holder 26 may be press fitted or otherwise securely retained on a shoulder 28 formed internally on the housing. If so desired, a cylindrical spacer or sleeve member 29 may be mounted to engage top surface portions of the bearing holder and juxtaposed surface portions of the port plate.

Such sleeve member aids in maintaining the integrated structures in their proper positions, including the clamping of bearing holder 26 against shoulder 28 to positively retain the thrust bearing in the pump. Bearing ring 27 is preferably positioned in an annular counterbore 30, formed in bearing holder 26, to have its inboard surface portions maintained substantially flush with resspect to the inboard surface portions of the bearing holder. The outboard surface portions of bearing ring 27 are preferably disposed to be substantially co-extensive with respect to the outboard surface portions of the cylinder barrel.

Ring 27 may be press fitted or otherwise suitably secured in counterbore 30 or may be loosely mounted therein to be "free-floating" to further reduce frictional drag. Ring member 27 may comprise a conventional bearing material adapted to substantially reduce frictional drag normally encountered at juxtaposed and relatively movable surface portions 31 formed on a shoulder of the barrel. The bearing holder may be composed of steel or suitable bearing material if so desired.

During pump operation, fluid leakage occurring between the juxtaposed and substantially contacting surface portions of cylinder barrel and the port plate will flow into an annular passage means 32 defined between the cylinder barrel and the housing and sleeve member 29. The lubricating fluid or oil, after having passed between ring member 27 and surface 31 for lubrication purposes, communicates with a case drain line 35. The positioning of the bearing ring slightly above the bearing holder defines an annular oil receiving chamber means 33, defined in part by inboard surface portions of bearing ring 27, at the termination of passage 32 to trap oil therein to ensure continuous lubrication of the thrust bearing during pump or motor operation.

It should be noted that when the rotating cylinder barrel separates slightly from the port plate that a hydrodynamic bearing effect is created at bearing ring 27. Upon such separation, closing of the area between surface 31 of the barrel and the bearing ring is resisted by an oil film which is constantly maintained in the area. The oil film prevents metal-to-metal contact from occurring between the barrel and bearing ring and is hydrodynamically induced on a continuous basis since the rotating barrel tends to draw oil into the area via passage 32.

FIG. 3 discloses a slight modification of the FIGS. 1 and 2 thrust bearing arrangement. In particular, a standard shim means or pack 34 is disposed between bearing holder 26a and bearing ring 27a to selectively adjust the operating clearance between the juxtaposed surface portions of the barrel and port plate.

What is claimed is.

1. In an axial piston-type pump or motor having a housing, a cylinder barrel rotatably mounted in said housing for rotation about a longitudinal axis thereof, relattively rotatable and contacting surface portions disposed substantially perpendicular relative to said axis and positioned between said housing and a first end of said cylinder barrel and port means formed through said surface portions for communicating fluid therethrough, the invention comprising hydrodynamic thrust bearing means located radially outwardly from said cylinder barrel between said cylinder barrel and said housing and being formed by a portion of the barrel axially spaced from said contacting surface portion and a fixed portion of the housing whereby fluid pressure between said portions will be determined by the relative position of the barrle with respect to the said fixed portion of the housing, fluid passageway means extending from said port means to and along the periphery of the barrel between said portions of the barrel and housing and thence downstream through a restricted area whereby the fluid pressure therein will be less than that pressure between the periphery of the barrel and housing, and vent means conducting fluid away from said restricted area.

2. The invention of claim 1 further comprising an input shaft operatively connected to said cylinder barrel for rotating same and spring means operatively connected between said input shaft and said cylinder barrel for urging said contacting surface portions into substantial contact.

3. The invention of claim 1 wherein said hydrodynamic thrust bearing means comprises at least one bearing ring juxtaposed to said barrel portion and said fixed housing portion and formed on a shoulder of said cylinder barrel.

4. The invention of claim 3 wherein said bearing ring is superimposed and fixedly mounted on an annular holder, said holder being fixedly mounted on a shoulder formed on said housing for preventing said bearing ring from moving radially and said bearing ring being positioned in juxtaposed relationship to said barrel portion and said fixed housing portion and formed on a shoulder of said cylinder barrel and further being positioned in an annular groove formed in said holder.

5. The invention of claim 1 further comprising a port plate defining said contacting surface portions by its abutment with surface portions of said cylinder barrel and a cylindrical sleeve member disposed between said cylinder barrel and housing to engage said hydrodrynamic thrust bearing means and juxtaposed surface portions of said port plate.

6. The invention of claim 1 further comprising annular passage means defined between said housing and said cylinder barrel for communicating lubricating fluid from said port means to said hydrodynamic thrust bearing means upon operation of said pump or motor.

7. The invention of claim 6 wherein said passage means terminates in an annular chamber means adjacent to said hydrodynamic thrust bearing means to trap a portion of said lubrication fluid therein.

8. The invention of claim 7 wherein said hydrodynamic thrust bearing means comprises at least one bearing ring juxtaposed to said barrel portion and said fixed housing portion and formed on a shoulder of said cylinder barrel, outboard surface portions of said bearing ring being disposed substantially flush with respect to outboard surface portions of said cylinder barrel, said annular chamber means being defined in part by the outboard surface portions of said bearing ring.

References Cited

UNITED STATES PATENTS

| | | | |
|---|---|---|---|
| 1,817,063 | 4/1931 | Carrie et al. | 103—162 |
| 1,817,080 | 8/1931 | Howward | 103—162 |
| 2,455,330 | 11/1948 | Dennison | 103—162 |
| 2,733,666 | 2/1956 | Poulos | 103—162 |
| 2,977,891 | 4/1961 | Bishop | 103—162 |
| 3,468,263 | 9/1969 | Niemiec | 103—162 |
| 2,064,299 | 12/1936 | Ferris et al. | 91—484 |
| 2,712,794 | 7/1955 | Humphreys | 91—485 |
| 2,733,666 | 2/1956 | Poulos | 91—485 |
| 2,895,426 | 7/1959 | Orshansky | 91—485 |
| 3,554,095 | 1/1971 | Bobst | 91—489 |

FOREIGN PATENTS

| | | | |
|---|---|---|---|
| 913,123 | 12/1962 | Great Britain | 91—499 |

WILLIAM L. FREEH, Primary Examiner